(12) United States Patent
Vu

(10) Patent No.: US 6,640,303 B1
(45) Date of Patent: Oct. 28, 2003

(54) SYSTEM AND METHOD FOR ENCRYPTION USING TRANSPARENT KEYS

(76) Inventor: Ky Quy Vu, 1842 Belle Meade Ct., Stone Mountain, GA (US) 30087

( * ) Notice: Subject to any disclaimer, the term of this patent is extended or adjusted under 35 U.S.C. 154(b) by 0 days.

(21) Appl. No.: 09/667,607

(22) Filed: Sep. 22, 2000

Related U.S. Application Data

(60) Provisional application No. 60/200,272, filed on Apr. 28, 2000.

(51) Int. Cl.[7] .............................. H04L 9/08; H04L 9/16; H04K 1/02
(52) U.S. Cl. ...................... 713/171; 713/169; 380/28; 380/45; 380/262; 380/283
(58) Field of Search ............................. 380/28, 44, 45, 380/46, 262, 263, 283, 284, 285; 713/169, 170, 171

(56) References Cited

U.S. PATENT DOCUMENTS

| | | | |
|---|---|---|---|
| 5,848,159 A | | 12/1998 | Collins et al. ................. 380/30 |
| 6,064,741 A | * | 5/2000 | Horn et al. .................. 380/285 |
| 6,069,954 A | * | 5/2000 | Moreau ........................ 380/28 |
| 6,219,421 B1 | * | 4/2001 | Backal ......................... 380/28 |
| 6,314,187 B1 | * | 11/2001 | Menkhoff et al. ............ 380/28 |

FOREIGN PATENT DOCUMENTS

| | | | |
|---|---|---|---|
| EP | 0 896 453 A2 | 2/1999 | ............. H04L/9/18 |

OTHER PUBLICATIONS

Loshin, Pete, "Personal Encryption Clearly Explained," Academic Press, pp. 61–118 and 421–436, 1998.
Menezes, Alfred J., et al., "Handbook of Applied Cryptography," CRC Press, 1997.
Menezes, A. et al, "Handbook of applied cryptography," CRC Press LLC, Boca Raton, US, 1997, pp. 20–21, 40–41, and 497–500.
Copy of International Search Report issused Nov. 1, 2002, 6 pages.

* cited by examiner

*Primary Examiner*—Thomas R. Peeso
*Assistant Examiner*—Justin T. Darrow
(74) *Attorney, Agent, or Firm*—Sterne Kessler Goldstein & Fox P.L.L.C.

(57) ABSTRACT

A method, system, and computer program product are provided for encrypting and decrypting information, such as electronic mail. Each party has a secret, unique, randomly assigned value y. A sender and receiver first engage in a preliminary message exchange, or "handshake." At this point, the sending party is given the y value of the receiving party. A key is then generated randomly or pseudo-randomly by the sending party. The key is used to encrypt a byte of information to be sent to the receiving party. A new key is generated for every byte to be encrypted. The resulting ciphertext is a combination of the output of a function F and a function P. F is a function of plaintext and the key. P is a function of the plaintext and the y value of the receiving party. During operation, y values and keys are not readily apparent to users.

21 Claims, 16 Drawing Sheets

SYSTEM AND METHOD FOR ENCRYPTION USING TRANSPARENT KEYS

CROSS-REFERENCE TO RELATED APPLICATION

This application claims the benefit of U.S. Provisional Application No. 60/200,272, filed Apr. 28, 2000 (incorporated in its entirety herein by reference).

BACKGROUND OF THE INVENTION

1. Field of the Invention

The invention described herein relates to information security, and more particularly to encryption.

2. Related Art

There are a number of approaches available for protecting information against compromise. One approach is the use of cryptography. Traditional cryptography is symmetric in the following respects: First, both a sending party and receiving party have logic, e.g., software or hardware, for performing the same cryptographic algorithm. Such logic encrypts or decrypts data based on a secret piece of information known as a cryptographic key. Second, each party has the same key. The sending party uses this key together with the cryptographic logic to encrypt information, also known as plaintext, to be sent to the receiving party. Encrypted information is known as ciphertext. The receiving party, having the same cryptographic logic and the same key as the sending party, can then decrypt the received ciphertext.

In such a system, the key typically remains unchanged for some period of time, such as a day, a week, or longer. The same key, therefore, can be used for multiple transmissions. An adversary who recovers the key and is able to procure the cryptographic logic will be able to decrypt any transmission made using that logic and key. In traditional symmetric key cryptography, therefore, the handling of key becomes a security issue. A key can be compromised, forgotten, or otherwise lost. Keys must therefore be protected from the moment they are produced, during distribution to end-users, and during use. In addition, a key must be destroyed in a reliable manner once it is no longer to be used.

In recent years, asymmetric or public key cryptography has become popular. In such systems, one key is used for encryption purposes and can be publically known. A second key is used for decryption, and is kept secret. This allows anyone to encrypt a message, but only an intended party who holds the secret decrypt key can access the underlying message. Even in asymmetric key systems, therefore, there is a secret component which must be protected, much as keys must be protected in symmetric cryptographic systems. Moreover, if the encryption key is public, then an authentication problem is created. Because anyone can encrypt a message, the receiving party has no way of knowing, necessarily, whether the sending party is who he claims to be.

Some public key systems resolve this authentication problem by involving a third party. The third party serves to vouch for the authenticity of a sending party and his communications. The third party may also be responsible for the storage and distribution of the keys. The third party must therefore be highly trusted. In practice, maintaining a third party for purposes of assuring the authenticity of parties and managing keys can prove to be a significant logistical problem. The associated hardware and software, as well as any human operators, must be trusted by all parties in a user community. In addition, the problem of handling large numbers of keys and maintaining the mapping of the keys to individual users can be difficult.

Hence there is a need for a cryptographic method and system that secures information but which minimizes the likelihood of key management problems, such as loss and compromise of keys. Moreover, such a method and system should ideally eliminate the need for a trusted third party.

SUMMARY OF THE INVENTION

The invention described herein is a method, system, and computer program product that encrypts and decrypts information, such as electronic mail. Each party has a secret, unique, randomly assigned value y. In an embodiment of the invention, y is hardwired in a party's encryption apparatus. A sending and receiving party first engage in a preliminary message exchange, or "handshake." At this point, the sending party is given the y value of the receiving party. A key is then generated randomly or pseudo-randomly by the sending party. The key is used to encrypt a byte of information to be sent to the receiving party. A new key is generated for every byte to be encrypted. The resulting ciphertext is a combination of the output of a function F and a function P. F is a function of plaintext and the key. In an embodiment of the invention, P is a function of the plaintext and the y value of the receiving party. During operation, y values and keys are not readily apparent to users.

The invention described herein has the feature of having y values that are unique and randomly assigned to every party. The invention also has the feature of generating a new key for every byte of information to be encrypted. The invention has the advantage of not needing an elaborate, secure key distribution and management infrastructure. The invention has the further advantage of using continually changing keys.

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

A preferred embodiment of the present invention is now described with reference to the figures, where like reference numbers indicate identical or functionally similar elements. Also in the figures, the left-most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

I. Introduction

The invention described herein is a method, system, and computer program product that encrypts and decrypts communications, such as electronic mail. Sending and receiving parties first engage in a preliminary exchange of messages, or handshake. The handshake allows a sending party to announce that a message is forthcoming, and allows the receiving party to acknowledge the sending party. Each party has a secret and unique value y. A y value is preferrably eight bits or longer. In an embodiment of the invention, a party's y value does not change. During the handshake, the sending party is given the y value of the receiving party and vice versa. The y values are not otherwise made known to the users. A key is then generated, randomly or pseudorandomly, by the sending party. The key is used to encrypt a byte of the message to be sent to the receiving party. An unencrypted message, or any portion thereof, is referred to as plaintext (PT). A new key is generated for every plaintext byte to be encrypted. Encryption involves two functions, F and P. Encrypted data, or ciphertext (CT), is a combination of the outputs of functions F and P. Both functions are performed by the sending party. F is a function of plaintext and the key. In an embodiment of the invention, P is a function of the plaintext and the y value of the receiving party. In an alternative embodiment of the invention, P is a function of the key and the y value of the receiving party. Because the keys are created and used without user intervention and without any key management infrastructure, the keys can be thought of as transparent.

II. Process

Figure 1:
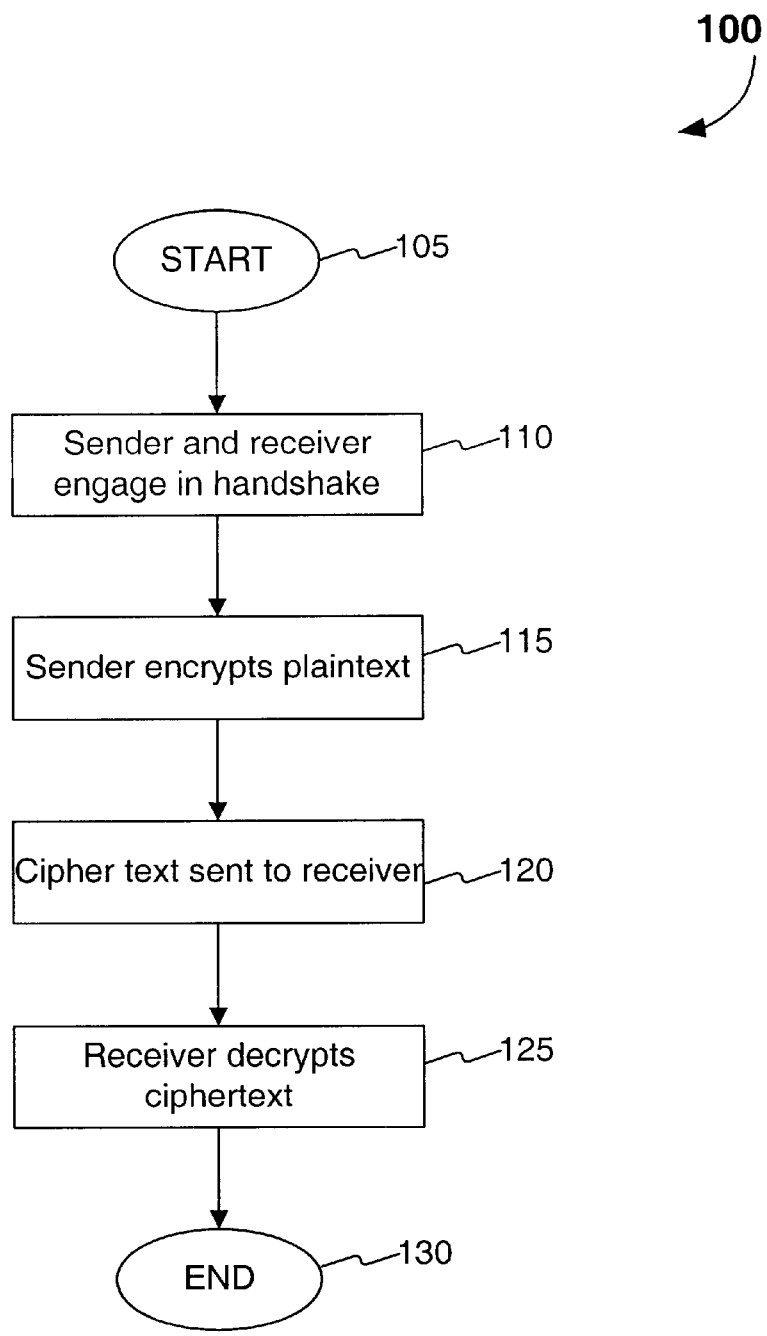
FIG. 1 is a flowchart illustrating the general method of the invention.

FIG. 1 illustrates overall cryptographic processing. The process begins with step 105. In step 110, the sending and receiving parties engage in a handshake process. In step 115, the sending party encrypts a plaintext message to form ciphertext. In step 120, the ciphertext is sent to the receiving party. In step 125, the receiving party decrypts the received ciphertext to form the original plaintext message. The steps illustrated in FIG. 1, as performed in this invention, are described in greater detail below.

A. Handshake

Figure 2:
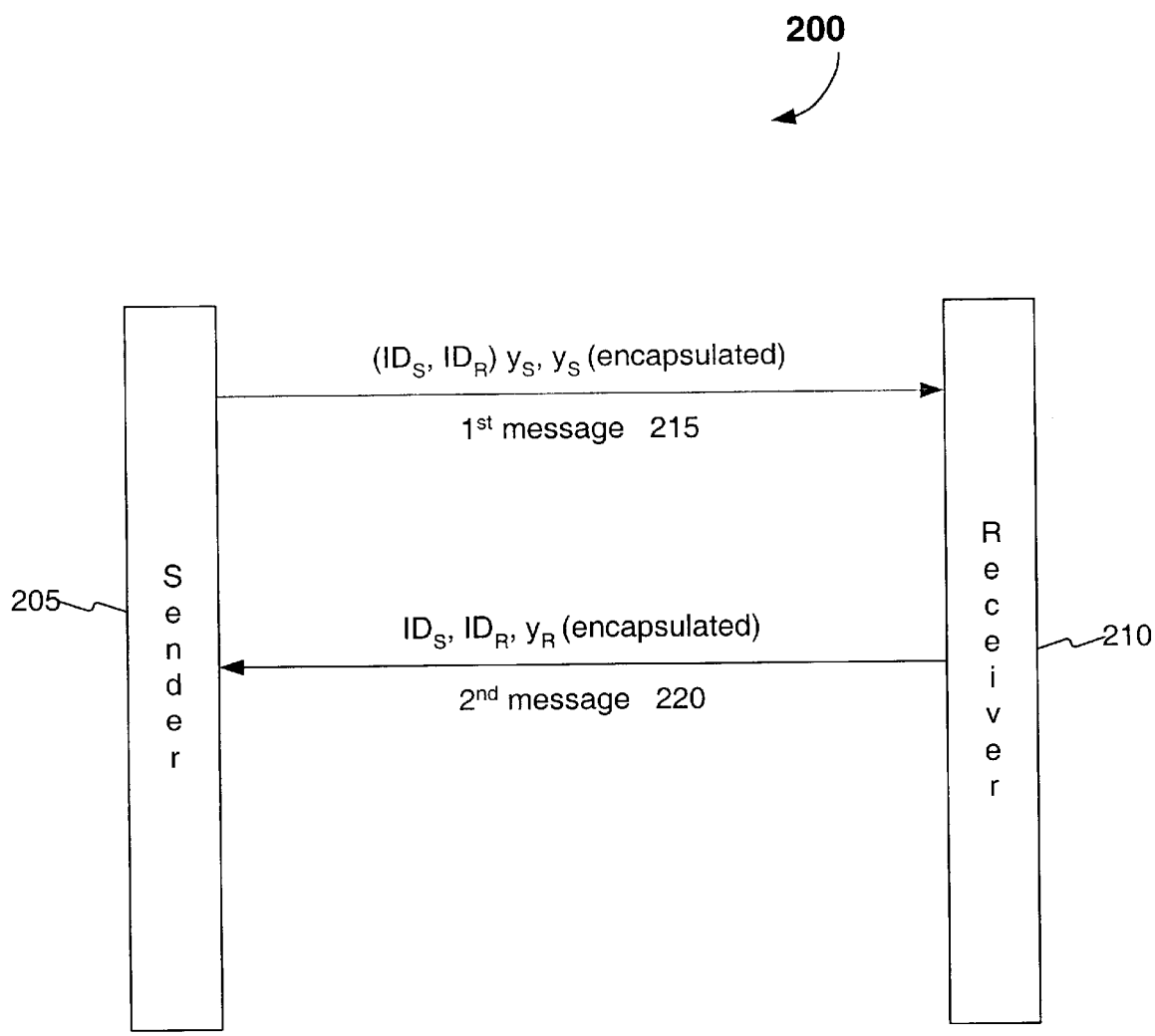
FIG. 2 illustrates the preliminary exchange of messages between sending party and receiving parties, according to an embodiment of the invention.

The first step in the encryption process is the handshake that takes place between the sending and receiving parties. The handshake involves an exchange of messages between the two parties. This allows the sending party to receive the y value of the receiving party and vice versa. The handshake is illustrated in FIG. 2. FIG. 2 shows a sending party 205 and a receiving party 210. The sending party 205 first sends a message 215 to the receiving party 210. Message 215 comprises an identifier for the sending party ($ID_S$) and an identifier for the receiving party ($ID_R$). An identifier can be a user name, terminal serial number, network address, or any information that unambiguously identifies a party. The two identifiers of message 215 are collectively referred to hereinafter as identification information. The identification information is encrypted. The sending party 205 encrypts the identification information in a manner to be described in greater detail below. The encryption is based on the y value of the sending party, $y_S$. In an embodiment of the invention, an encapsulated or encoded version of $y_S$ is also sent with the encrypted identification information. Message is therefore denoted $(ID_S, ID_R)y_S, y_S$. After receipt of message 215, the receiving party 210 returns an acknowledgment message, message 220. Message 220 contains the identification information as well as the y value of the receiving party, $y_R$. In an embodiment of the invention, the y value of the receiving party may be in an encapsulated form or otherwise coded for transmission purposes.

Figure 3:
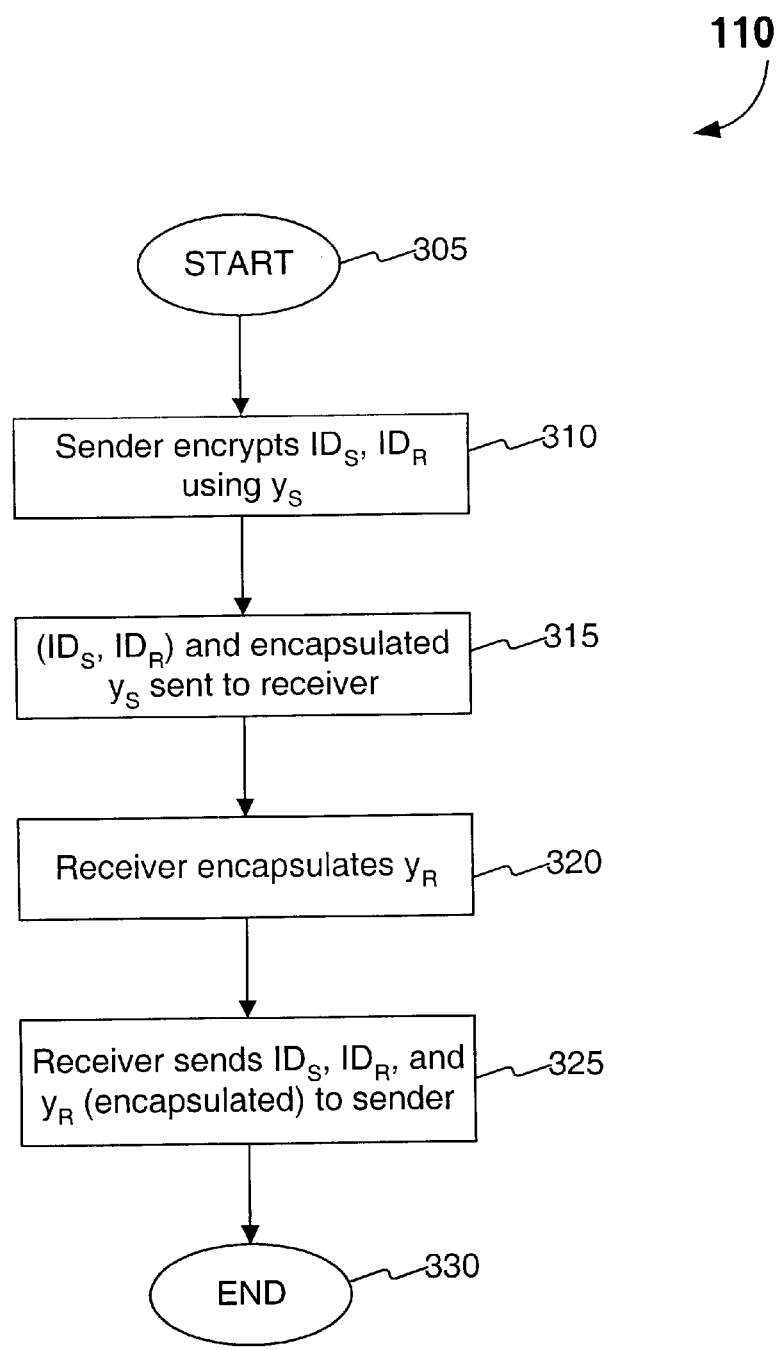
FIG. 3 is a flowchart illustrating the steps that takes place during the handshake, according to an embodiment of the invention.

The process of the handshake, step 110 of FIG. 1, is illustrated in FIG. 3. The process begins at step 305. In step 310, the sender encrypts the identification information. As described above, encryption uses the sender's own y value, $y_S$ In step 315, the encrypted identification information is sent to the receiving party. In step 320, the receiving party encapsulates or encodes its y value, $y_R$. In step 20 325, the receiving party sends the identification information along with the encapsulated $y_R$ to the sending party. The process concludes at step 330.

Note that in this embodiment, $y_R$ is sent from the receiving party to the sending party during the handshake. In an alternative embodiment of the invention, $y_R$ is sent to the sending party through a different protected channel. This value can, for example, be transported using a physical storage medium such as a diskette or other memory device. Alternatively, $y_R$ can be encrypted using some alternative cryptographic process and transmitted.

Figure 4:
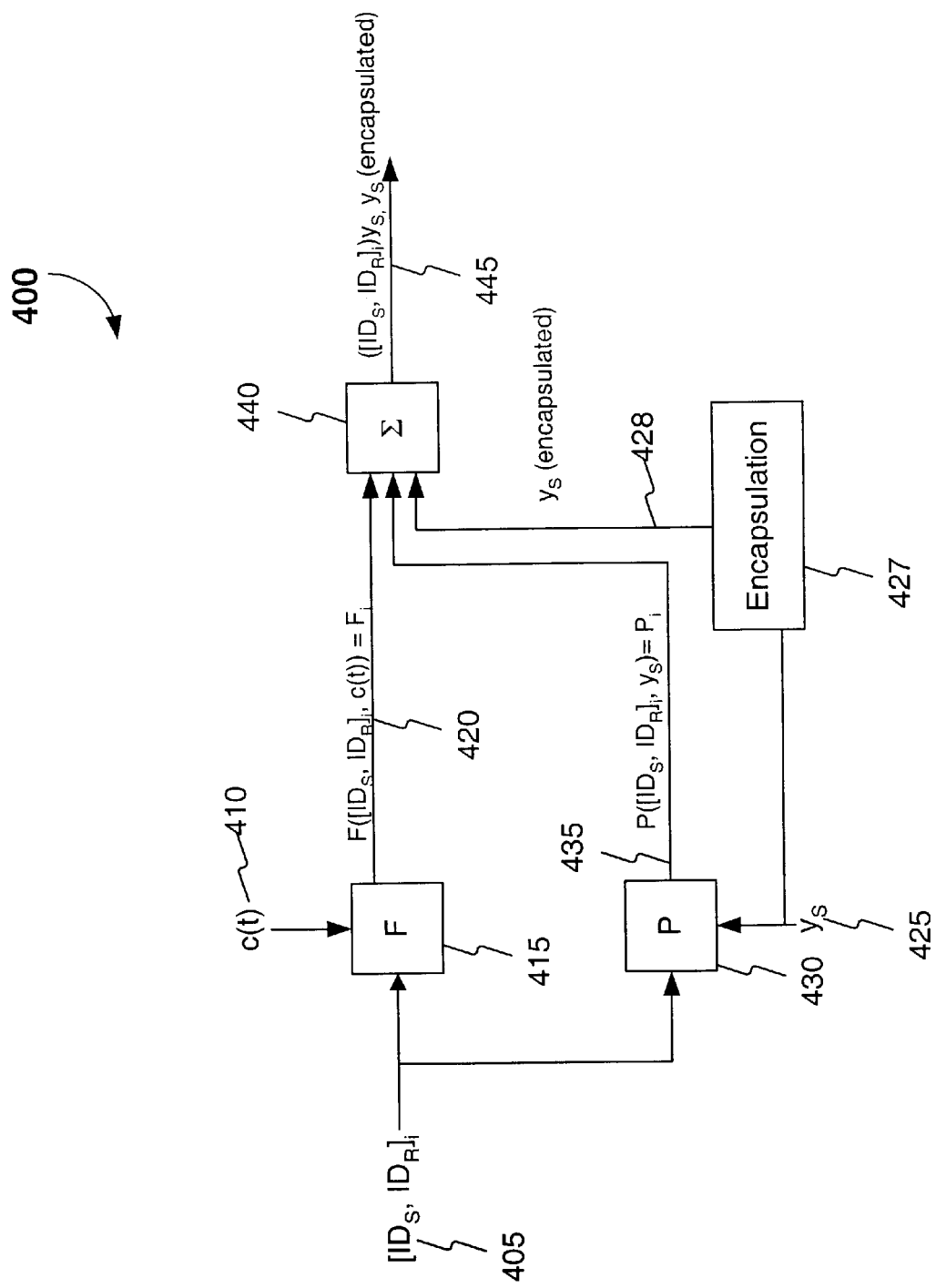
FIG. 4 is a block diagram illustrating data flow and processing during the encryption of identification information, according to an embodiment of the invention.

The encryption of a byte of identification information is illustrated in FIG. 4. Identification information is input to a function 415, also known as function F, one byte at a time. The $i^{th}$ byte of identification information 405 is denoted $[ID_S, ID_R]_i$. Another input to F is key 410, also known as c(t). In an embodiment of the invention, key 410 is eight bits long and can be drawn from a random noise source. Alternatively, key 410 can be the output of a linear recursive sequence generator or any other pseudorandom deterministic data source. The function F can be any function, provided that the function is a non-periodic one-to-one invertible mapping. If the output of F is known and one of the inputs is known, the other input to F must be derivable. F can, for example, be arithmetic addition or multiplication. F can also be exponentiation, or can be a more elaborate function, such as Fourier transformation or LaPlace transformation. The output 420 of function F, $F_j$, is then sent to a combiner 440. Meanwhile, the $i^{th}$ byte of identification information 405 is also sent to a function 430. Function 430 is also known as function P. In encrypting the identification information, the y value of the sender, value 425, known as $y_S$, is also input to function P. Like function F, function P must also be a non-periodic one-to-one invertible mapping. For example, P could be addition, multiplication, exponentiation, or Fourier or LaPlace transformation. Function P, however, cannot be the same function as function F. If, for example, function F is arithmetic addition, function P cannot be arithmetic addition. Function P could instead be multiplication or exponentiation for example. Output 435 of function P, $P_j$, is also sent to combiner 440. $y_S$ is also sent to encapsulation operation 427, which produces an encapsulated version of $y_S$, 428. Combiner 440 serves to combine the three inputs 420, 428, and 435 in such a manner that the result 445 can be decomposed into its constituent parts, inputs 420, 428, and 435. Examples of combination operations that achieve this include any multiplexing operation known to persons of ordinary skill in the art.

Figure 5:
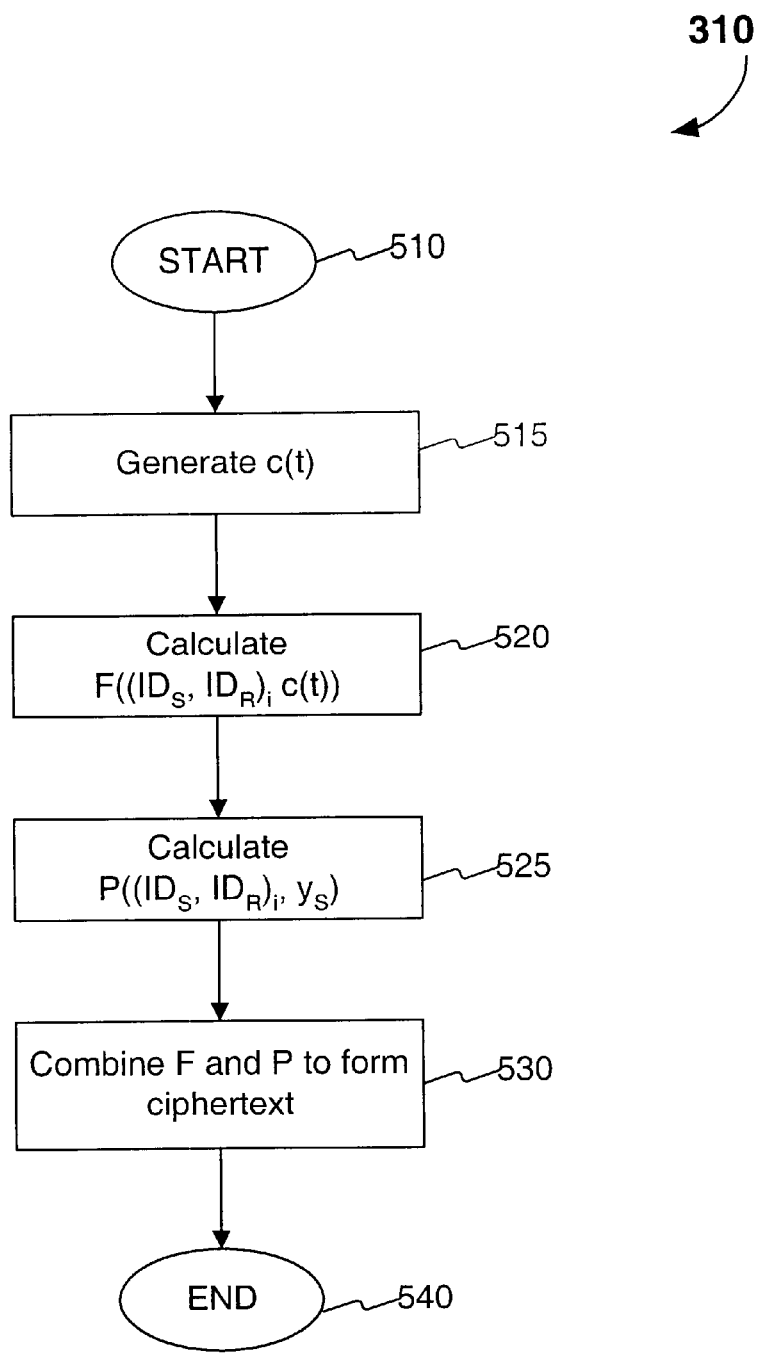
FIG. 5 is a flowchart illustrating the steps of encrypting identification information, according to an embodiment of the invention.

The steps of encrypting each byte of identification information are illustrated in FIG. 5. The process begins with step 510. In step 515, the sending party generates a key c(t). As described above, the key can be the output of a deterministic process, or the output of a random noise source. In step 520, the sending party calculates the value of function F, where the inputs to F are a byte of the identification information and the key. In step 525, the sending party generates the value of function P, where the inputs are the same byte of identification information and the y value of the sending party, $y_S$. In step 530, the sending party combines the outputs of F and P to form ciphertext. As discussed 5 above, the combination operation can, for example, be multiplexing. The process concludes with step 540.

Decryption of the identification information can be performed during the authentication process. This is described below in section II. E.

B. Encryption of Plaintext

Figure 6:
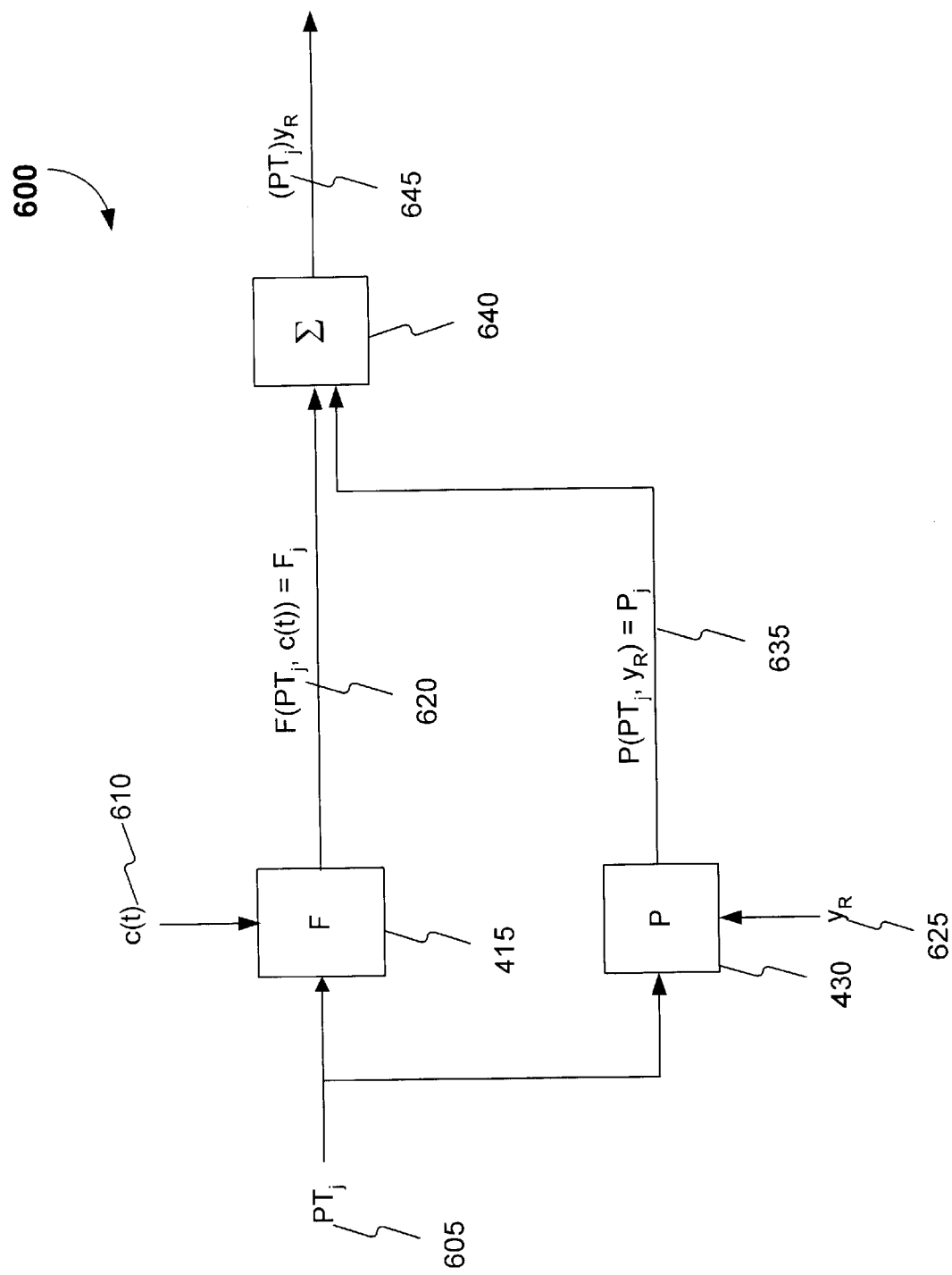
FIG. 6 illustrates data flow and processing during the encryption of a message, according to an embodiment of the invention.

The flow and processing of information during encryption of each byte of a plaintext message is illustrated in FIG. 6. The information 605 to be encrypted, a $j^{th}$ byte of plaintext $PT_j$, is input to function 415, i.e., function F. Also input to function F is a key 610. Note that key 610 is not necessarily the same key as key 410 in FIG. 4. At each time t that a key is needed as an input to function F, such a key must be generated anew from whatever source is being used. The output 620 of function F, $F(PT_j, c(t))=F_j$, is then sent to combiner 440. Plaintext byte 605 is also sent to function 430, i.e., function P. $y_R$ the y value 625 of the receiving party, is also input to function P. The output 635 of function P, $P(PT_j, y_R)=P_j$ is then sent to combiner 640. The output of combiner 640 is ciphertext 645. Combiner 640 serves to combine the two inputs 620 and 635 in such a manner that the result 645 can be decomposed into its constituent parts, inputs 620 and 635. Examples of combination operations that achieve this include any multiplexing operation known to persons of ordinary skill in the art.

Figure 7:
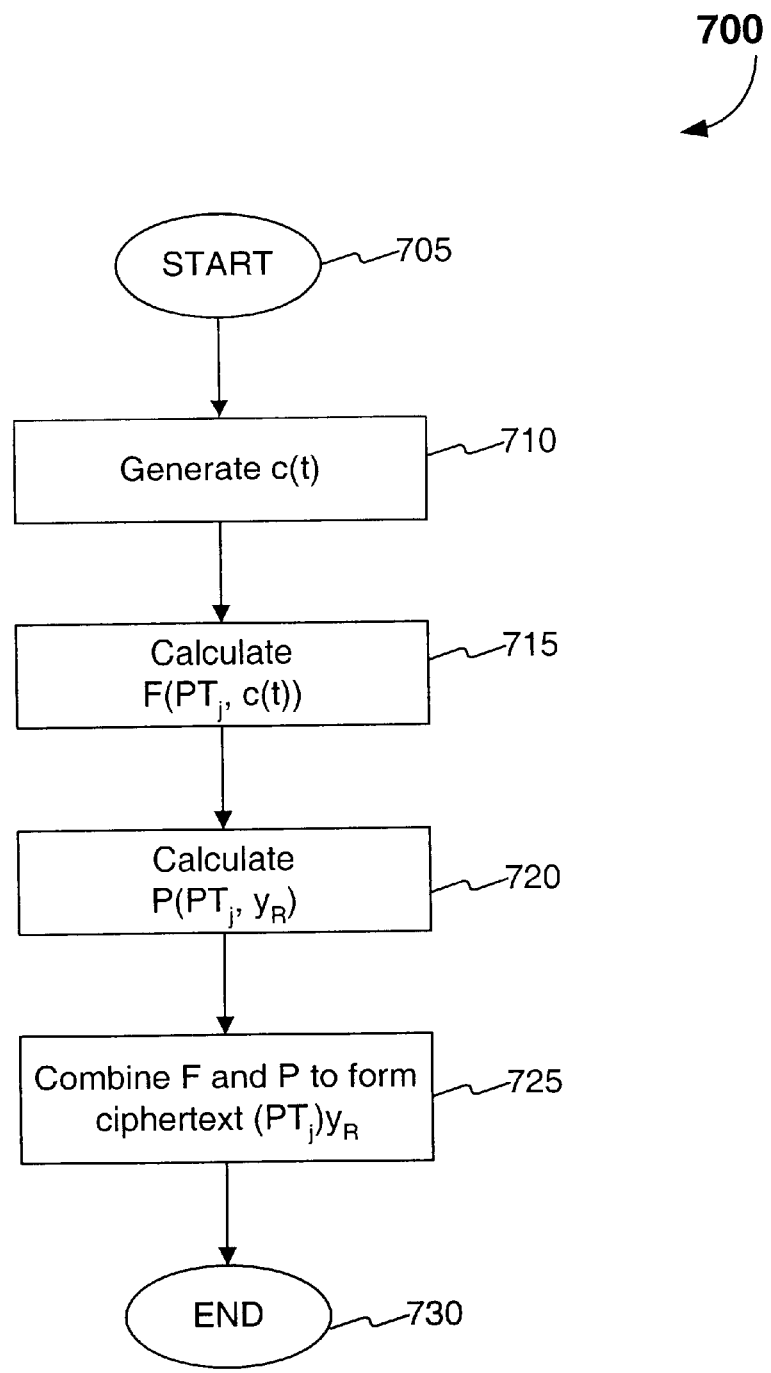
FIG. 7 is a flowchart illustrating the steps of encrypting a message, according to an embodiment of the invention.

The process of encrypting a message is illustrated in FIG. 7. The process begins with step 705. In step 710, the sending party generates a key c(t). In step 715, the sending party calculates the value of function F, where the inputs to F are the $j^{th}$ byte of the plaintext to be encrypted and the key. In step 720, the sending party calculates the value of function P, where the inputs to P are the $j^{th}$ byte of plaintext and the y value of the receiving party, $y_R$. In step 725, the values of F and P are combined to form ciphertext. The process concludes at step 730.

The transmission of ciphertext will typically take place in a telecommunications environment that requires adherence to predetermined protocols. Such protocols may, for example, be those promulgated by national or international standards bodies. The formatting of ciphertext must necessarily adhere to such standards. Moreover, the formatting of the ciphertext must also allow a receiving party to recover the F and P values that represent the $j^{th}$ byte of plaintext. Formatting and transmission processes that adhere to the necessary protocols and allow a receiving party to recover these values are well known to persons of ordinary skill in the art.

C. Decryption of Ciphertext

Figure 8:
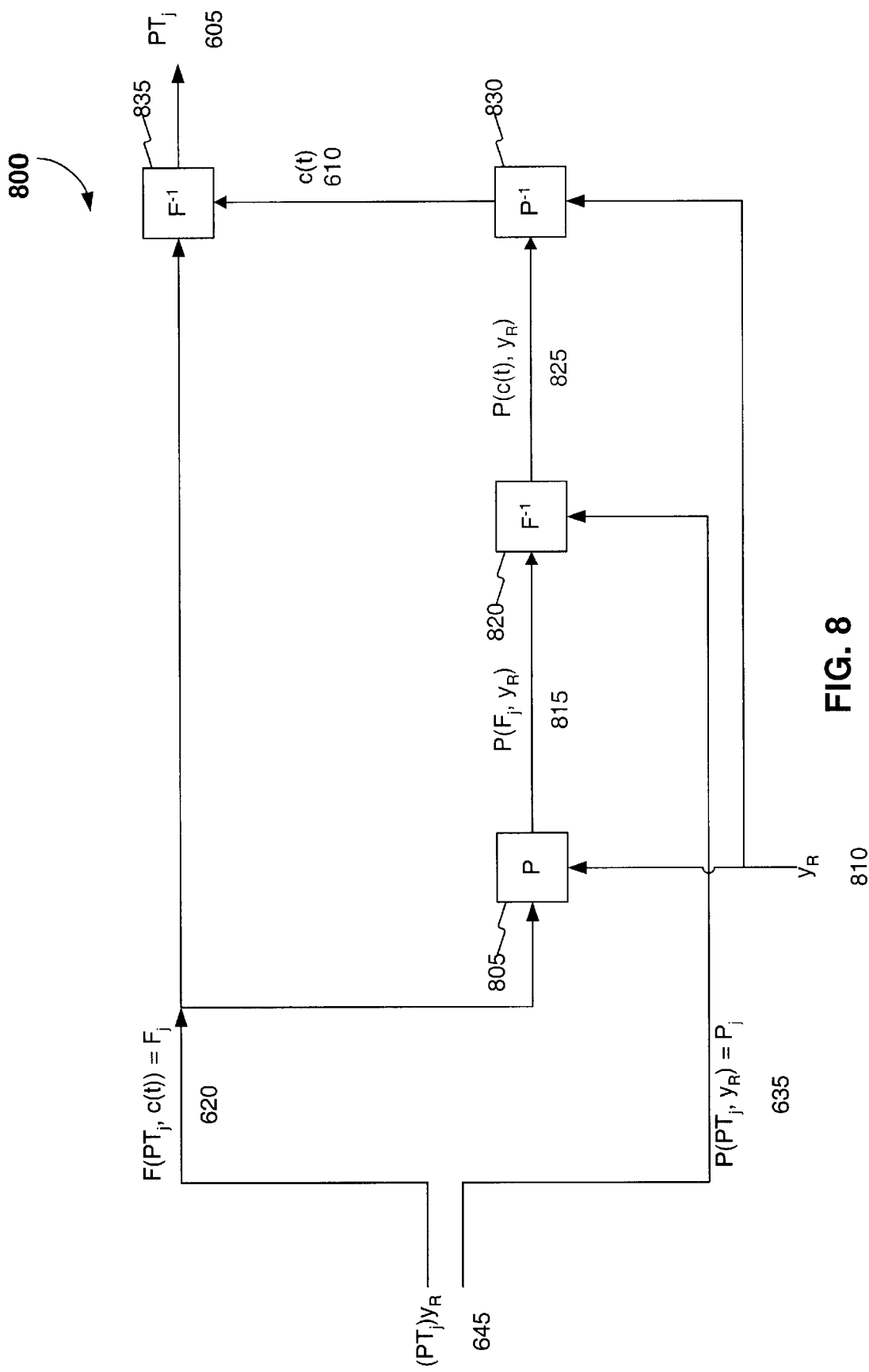
FIG. 8 illustrates data flow and processing during decryption of a message, according to an embodiment of the invention.

The flow and processing of information at the receiving party during decryption is illustrated in FIG. 8. The received ciphertext 645 corresponding to the $j^{th}$ byte of plaintext is first decomposed into its constituent components, the value 620, $F(PT_j, c(t))=F_j$, and the value 635, $P(PT_j, y_R)=P_j$. For example, the combination process of step 725 can be a multiplexing operation known to persons of ordinary skill in the art. If so, the decomposition process at the receiving party is the corresponding demultiplexing operation, likewise known to persons of ordinary skill in the art. The F value 620 is input to the receiving party's P function 805. The P function of the receiving party is identical to the P function of the sending party. The receiving party's y value 810, $y_R$, is also input to function 805. The result 815 is then sent to function 820, $F^{-1}$. This function is the inverse of the sending party's F function. The P value 635 is also input to function 820. The output 825 of function 820 is then sent to function 830, $P^{-1}$. The receiving party's y value 810 is also input to function 830. The output of function 830 is the key 610, c(t). Key 610 is input to function 835, $F^{-1}$, along with F value 620. The result is byte 605, the $j^{th}$ byte of plaintext.

Figure 9:
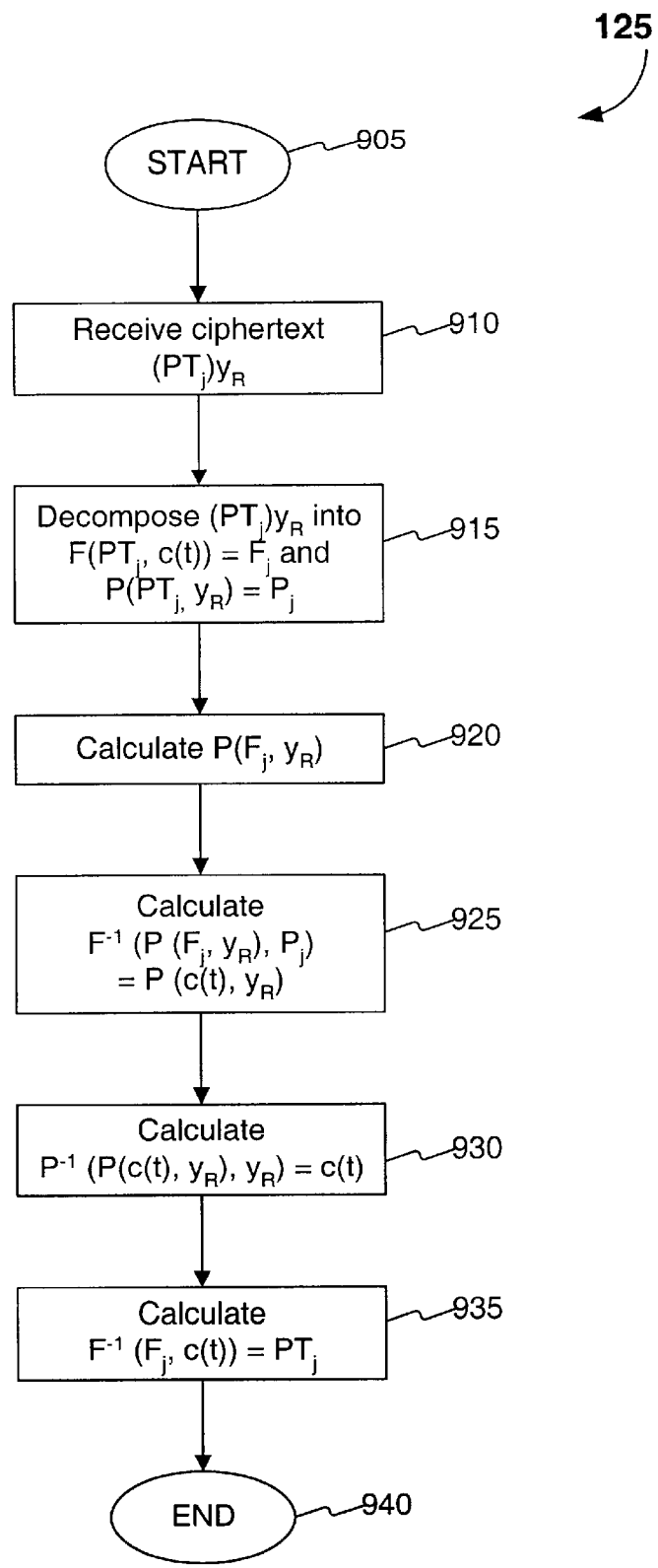
FIG. 9 is a flowchart illustrating the steps of decrypting a message, according to an embodiment of the invention.

The steps of decrypting received ciphertext are illustrated in FIG. 9. The process begins with step 905. In step 910, the receiving party receives ciphertext from the sending party. In step 915, the received ciphertext is decomposed into two components, the values of the F function and the P function as calculated by the sending party. In step 920, the receiving party calculates the value of P where the inputs are the received F value from the sending party and the receiving party's y value, $y_R$. In step 925, the receiving party calculates $F^{-1}$, where the inputs are the value calculated in step 920 and the received P value from the sending party. In step 930, the receiving party calculates $P^{-1}$, where the inputs to $P^{-1}$ are the output of step 925 above and $y_R$. This result is equal to the key c(t) generated by the sending party. In step 935, the receiving party calculates $F^{-1}$, using as inputs the F value received from the sending party and the key c(t) calculated in step 930. The result of this operation is the plaintext byte $PT_j$ encrypted by the sender. The process concludes at step 940.

D. Alternative Embodiment

In an alternative embodiment of the invention, encryption and decryption still use functions F, $F^{-1}$, P, and $P^{-1}$ and values c(t) and $y_R$. This embodiment is described below.

1. Encryption

Figure 10:
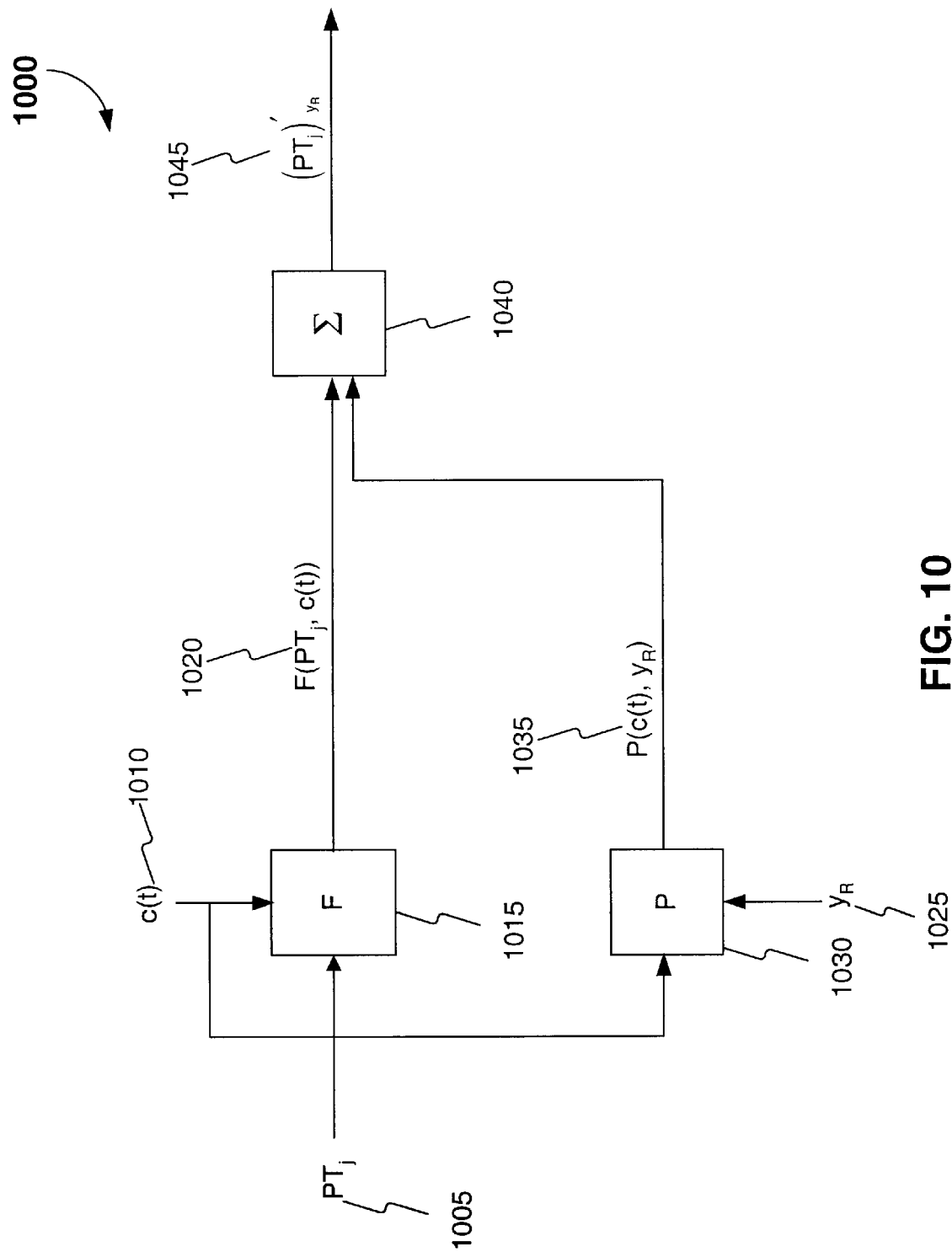
FIG. 10 illustrates data flow and processing during the encryption of a message, according to an alternative embodiment of the invention.

In the alternative embodiment, a sending party's encryption of a byte of a plaintext message is illustrated in FIG. 10. The information 1005 to be encrypted, a $j^{th}$ byte of plaintext $PT_j$, is input to function 1015, i.e., function F. Also input to function F is a key 1010. As discussed above, at each time t that a key is needed as an input to function F, such a key must be generated anew from whatever source is being used. The output 1020 of function F, $F(PT_j, c(t))=F_j$, is then sent to combiner 1040. c(t) 1010 is also sent to function 1030, i.e., function P. $y_R$, the y value 1025 of the receiving party, is also input to function P. The y value 1025 will have been received by the sending party during the handshake process as described above. The output 1035 of function P, $P(c(t), y_R)$, is then sent to combiner 1040. The output of combiner 1040 is ciphertext 1025, denoted $(PT_j)'y_R$.

Figure 11:
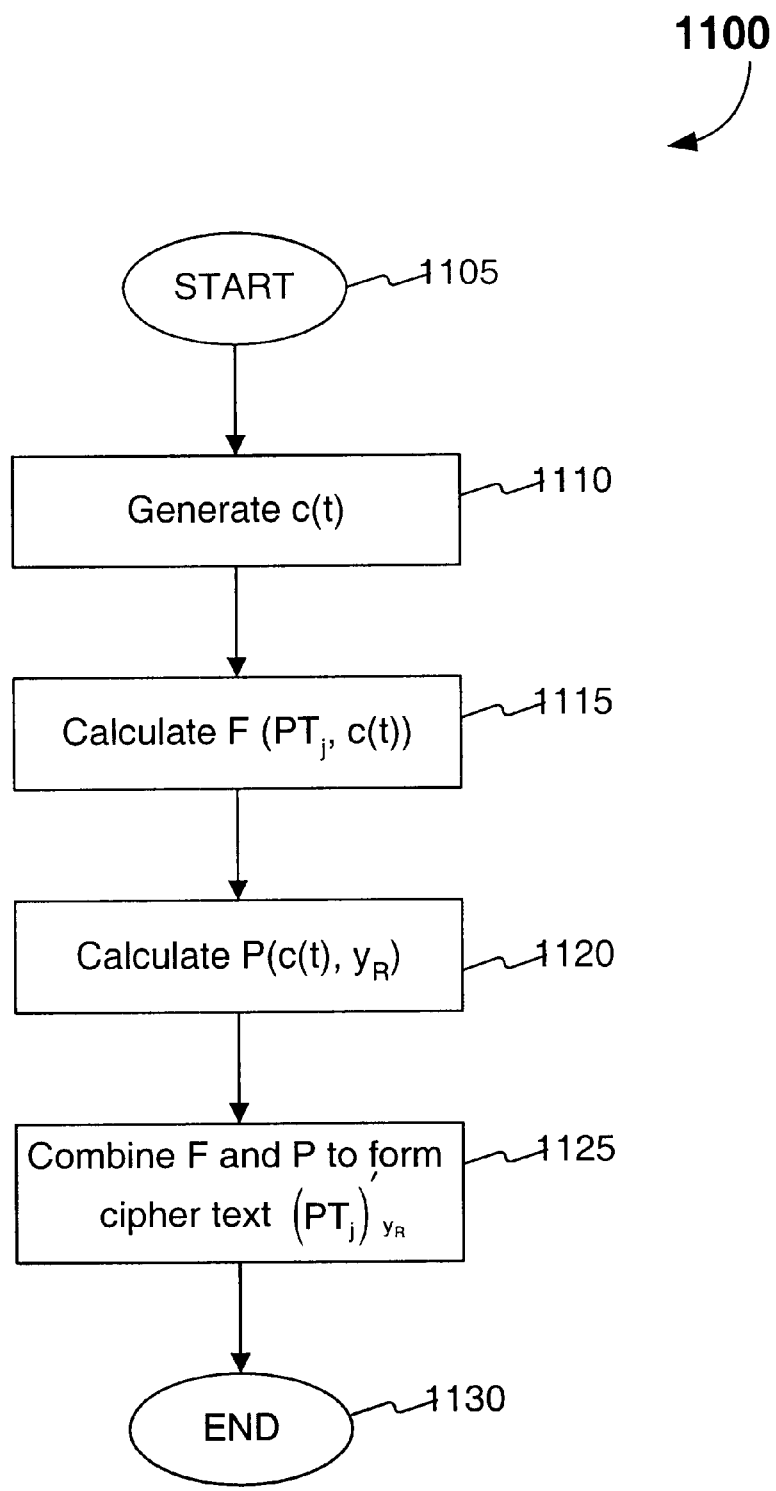
FIG. 11 is a flowchart illustrating the steps of encrypting a message, according to the alternative embodiment of the invention.

The process of encrypting a message is illustrated in FIG. 11. The process begins with step 1105. In step 1110, the sending party generates a key c(t). In step 1115, the sending party calculates the value of function F, where the inputs to F are the $j^{th}$ byte of the plaintext to be encrypted and the key. In step 1120, the sending party calculates the value of function P, where the inputs to P are the key c(t) and the y value of the receiving party, $y_R$. In step 1125, the values of F and P are combined to form ciphertext. The process concludes at step 1130.

2. Decryption

Figure 12:
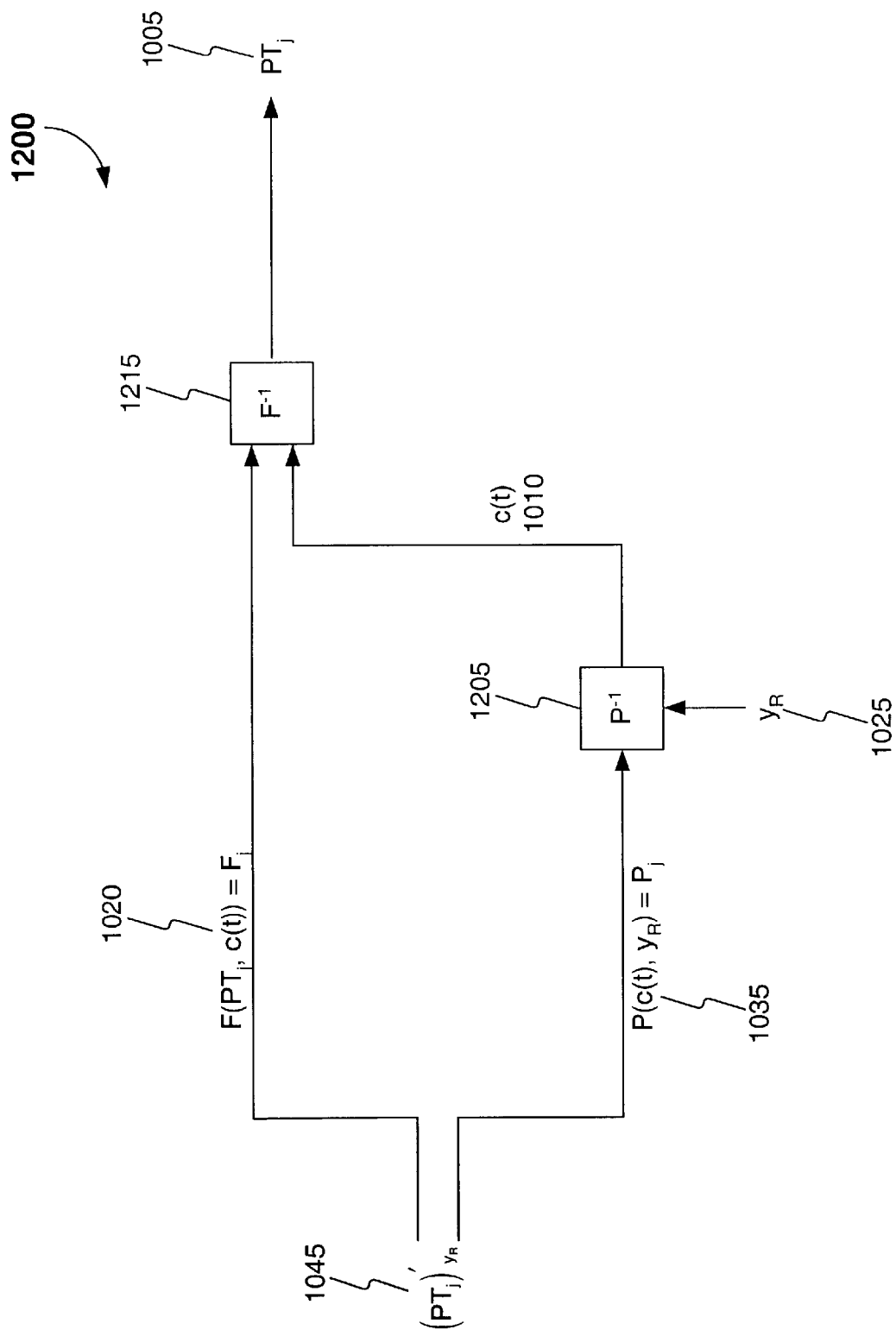
FIG. 12 illustrates data flow and processing during decryption of a message, according to the alternative embodiment of the invention.

For the alternative embodiment, the flow and processing of information at the receiving party during decryption is illustrated in FIG. 12. The received ciphertext 1045 (corresponding to the $j^{th}$ byte of plaintext) is first decomposed into its constituent components, the value 1020, $F(PT_j, c(t))=F_j$, and the value 1035, $P(c(t), y_R)=P_j$. The $P_j$ value 1035 is input to $P^{-1}$, function 1205. This function is the inverse of the P function of the sending party. The receiving party's y value 1025, $y_R$, is also input to function 1205. The output of function 1205 is key 1010, c(t). Key 1010 is then sent to function 1215, $F^{-1}$. Value 1020, $F_j$, is also sent to function 1215. This function is the inverse of the sending party's F function. The output of function 1215 is byte 1005, the $j^{th}$ byte of plaintext.

Figure 13:
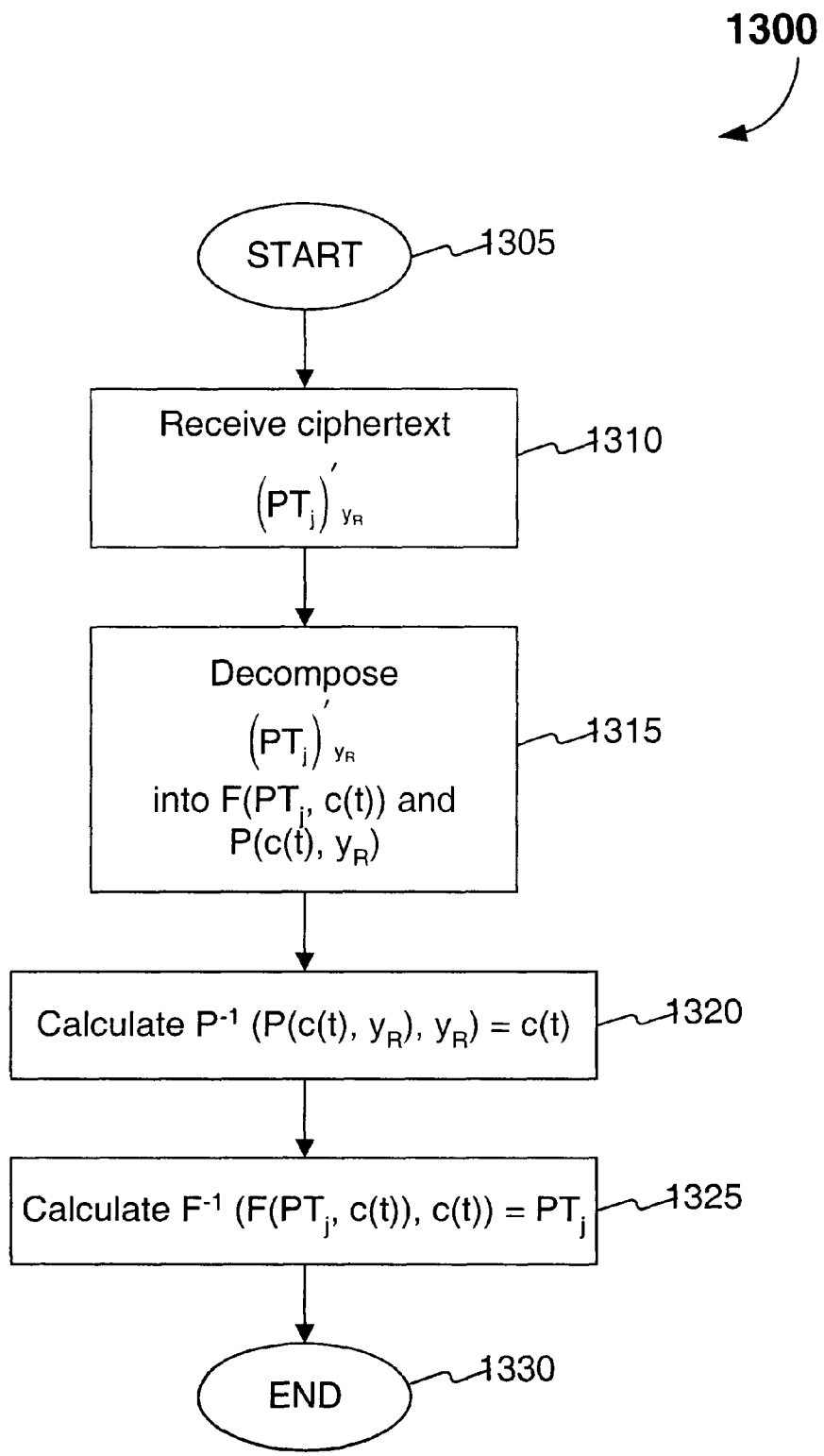
FIG. 13 is a flowchart illustrating the steps of decrypting a message, according to the alternative embodiment of the invention.

The steps of decrypting received ciphertext are illustrated in FIG. 13. The process begins with step 1305. In step 1310, the receiving party receives ciphertext from the sending party. In step 1315, the received ciphertext is decomposed into two components, the values of the F function and the P function as calculated by the sending party. In step 1320, the receiving party calculates $P^{-1}$, where the inputs to $P^{-1}$ are the received value of the P function and $y_R$. The result is equal to the key c(t) generated by the sending party. In step 1325, the receiving party calculates $F^{-1}$, using as inputs the F value received from the sending party and the key c(t) calculated in step 1320. The result of this operation is the plaintext byte $PT_j$ encrypted by the sending party. The process concludes at step 1330.

E. Authentication

In addition to sending ciphertext as described above in section II. B., the sending party may also send his own y value, $y_S$, to the receiving party. In an embodiment of the invention, $y_S$ is sent in a secure manner. For example, $y_S$ can be treated as plaintext by the sending party, and encrypted and sent to the receiving party. Once the receiving party has $y_S$, the encrypted identification information sent by the sending party in the handshake can be decrypted. The identification information can then be used for authentication purposes. For example, the identification information may be known in advance to the parties and known only by those communicating parties. If so, the receiving party can verify the authenticity of a transmission by decrypting the identification information and reading the identity of the sender.

Figure 14:
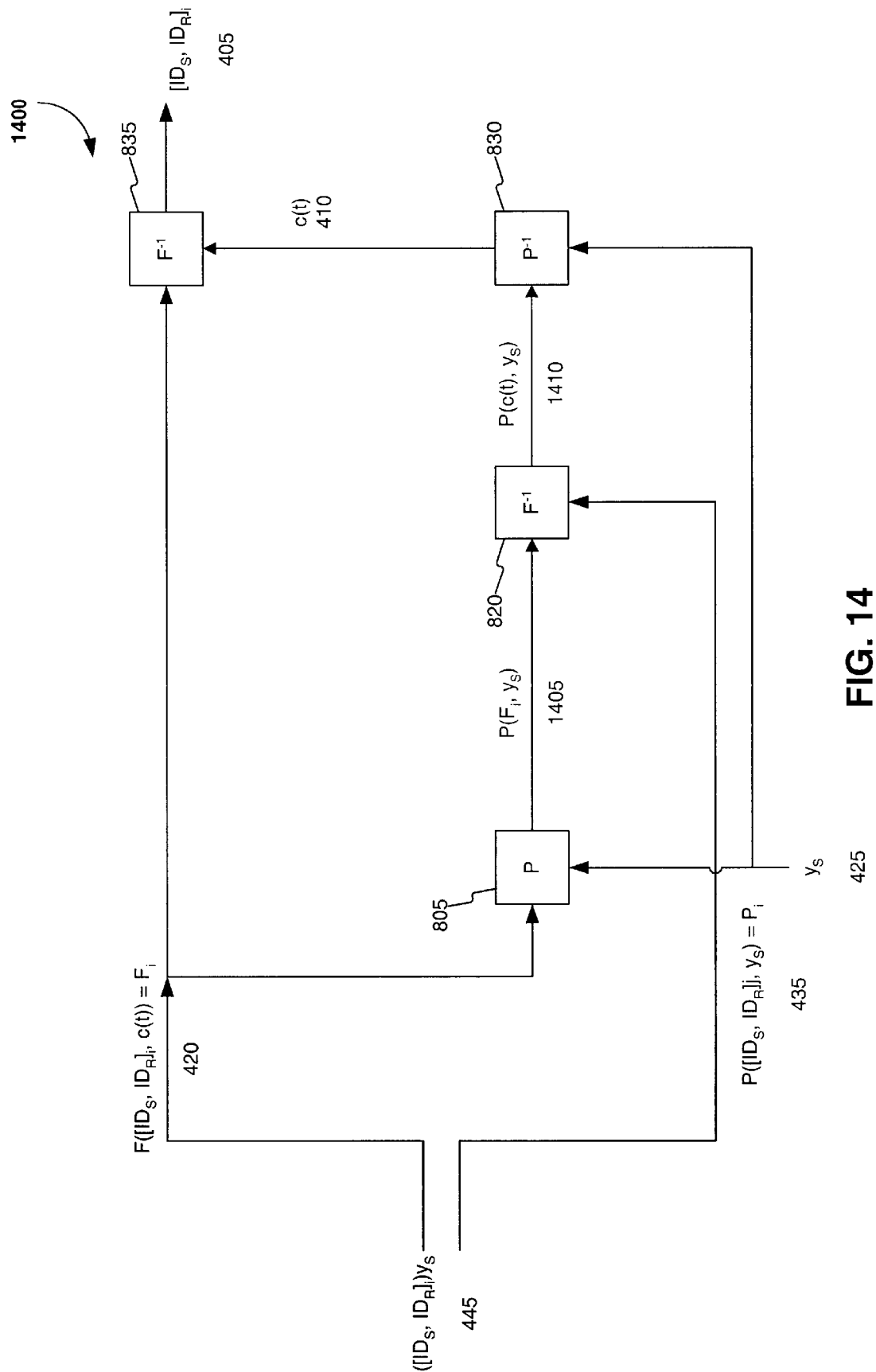
FIG. 14 illustrates data flow and processing during decryption of identification information, according to an embodiment of the invention.

The flow of information and processing related to the decryption of the identification information by the receiving party is illustrated, according to an embodiment of the invention, in FIG. 14. Information 445, the encrypted form of the $i^{th}$ byte of identification information, is first decomposed into its constituent components, the F value 420 ($F_i$) and the P value 435 ($P_i$). For example, the combination process of step 530 can be a multiplexing operation known to persons of ordinary skill in the art. If so, the decomposition process at the receiving party is the corresponding demultiplexing operation, likewise known to persons of ordinary skill in the art. Recall that these values 420 and 435 were generated by the sending party during encryption of the $i^{th}$ byte of identification information (405), as illustrated in FIG. 4. The F value 420 is input to the P function 805 along with the y value 425 of the sending party, $y_S$. The output 1405 of P function 805 is then input to an $F^{-1}$ function 820, along with the received P value 435. The output 1410 of function 820 is then input to function 830, $P^{-1}$, along with y value 425. The output of function 830 is the key 410, c(t), that had originally been generated by the sending party for purposes of encryption of the $i^{th}$ bye of identification information. Key 410 is input to $F^{-1}$ function 835, along with received F value 420. The result of function 835 is the $i^{th}$ byte of identification information (405). Identification information 405 can then be used by the receiving party for purposes of authenticating the sending party.

Figure 15:
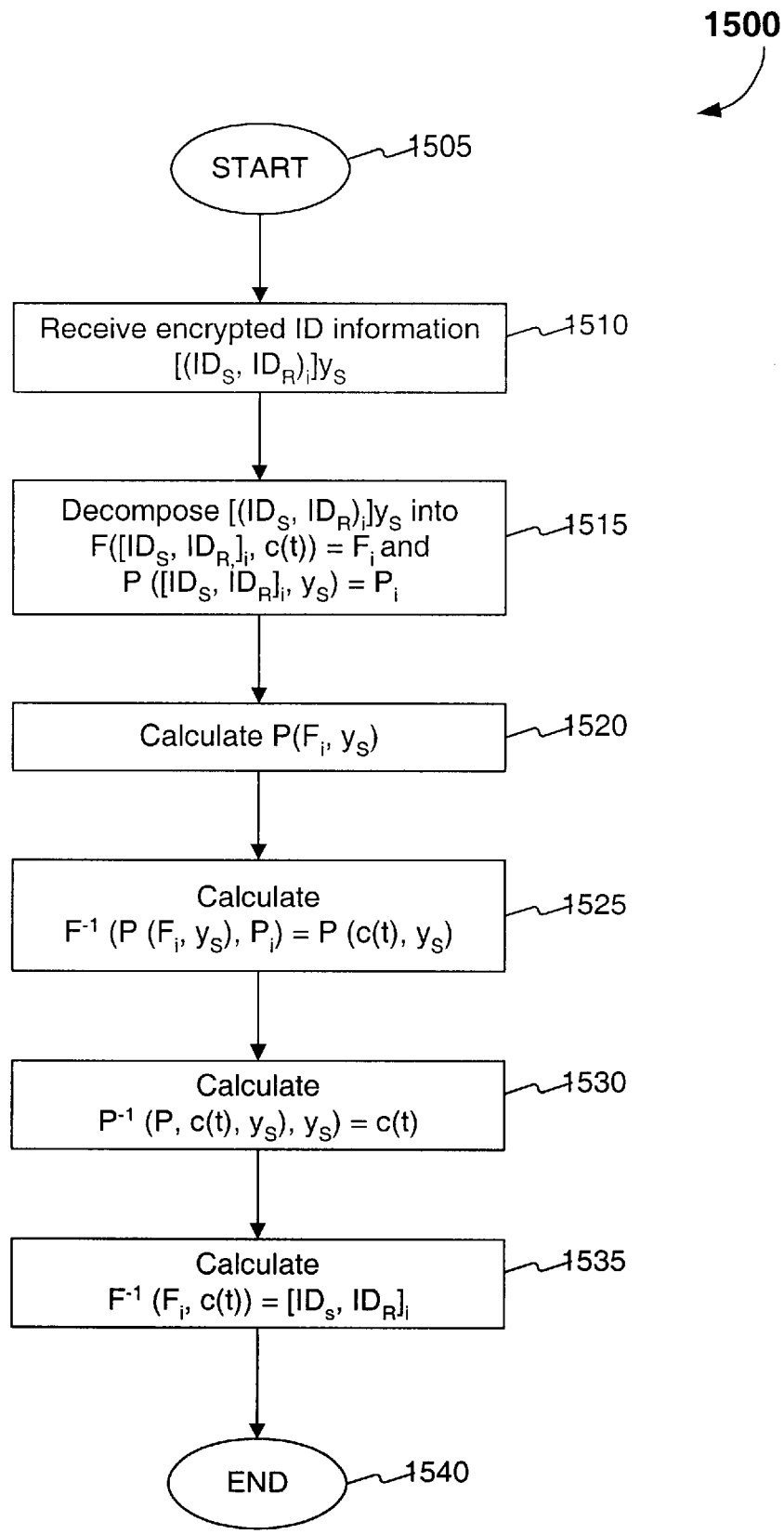
FIG. 15 is a flowchart illustrating the steps of decrypting identification information, according to an embodiment of the invention.

The steps of decrypting identification information are illustrated in FIG. 15. The process begins at step 1505. At step 1510, the encrypted $i^{th}$ byte of identification information is received. In step 1515, this information is decomposed into the F value calculated originally by the sending party in step 520, and the P value generated by the sending party in step 525. In step 1520, the receiving party calculates a value of P, using as inputs the received F value and the y value of the sending party, $y_S$. In step 1525, the result of step 1520 is input to $F^{-1}$, along with the received P value. In step 1530, the output of step 1525 is input to $P^{-1}$, along with $y_S$. The result is the key c(t) generated by the sending party during encryption of the $i^{th}$ byte of identification information. In step 1535, the receiving party calculates $F^{-1}$, using as inputs the received F value and the key c(t) calculated above in step 1530. The output of $F^{-1}$ in step 1535 is the $i^{th}$ byte of identification information. The process concludes with step 1540.

III. Apparatus

Figure 16:
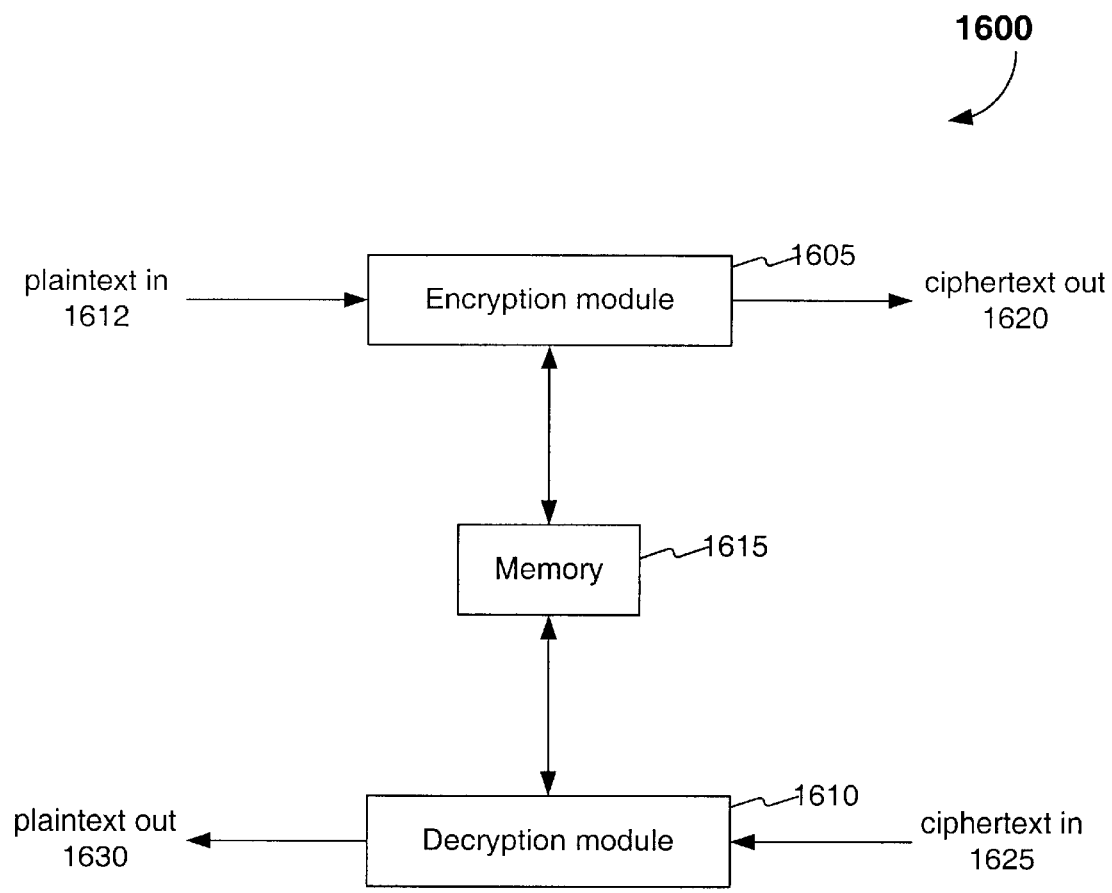
FIG. 16 illustrates the overall architecture of the system of the invention, according to an embodiment.

An apparatus for implementing the invention is illustrated generally in FIG. 16. Apparatus 1600 includes an encryption module 1605, a decryption module 1610, and memory 1615. Encryption module 1605 performs the encryption functions described above, including functions F and P. Encryption module 1605 accepts, as input, a byte 1612 of plaintext and produces ciphertext 1620. Decryption module 1610 performs the decryption operations described above, including functions $F^{-1}$, P, and $P^{-1}$. Decryption module 1610 accepts plaintext 1625 as input and produces byte 1630 of plaintext. Memory 1615 can be used to store the y value of the local party. In alternative embodiments, memory 1615 can also be used for secure storage of ciphertext, plaintext, or previously received y values of other parties.

In an embodiment of the invention, modules 1605 and 1610 can be implemented as complex programmable logic device technology (CPLD). Note that, in general, a hardware implementation is relatively fast, and is relatively difficult to reverse engineer. Alternatively, the logic of modules 1605 and 1610 can be implemented in software.

As discussed above, each party has its own distinct y value. Hence, only the owner of a given y value (or a party to whom the value has been given) can decrypt information encrypted with the value. No one else can decrypt such information. The uniqueness of the y values therefore contributes to the security of the system. Moreover, a y value is stored in the encryption/decryption apparatus 1600 of its owner and is exposed only in encapsulated form during the handshake, according to embodiment of the invention. Hence the y value is protected to an extent and never directly exposed. This feature also contributes to the system's security.

IV. An Example Encryption/Decryption

The following is a sample encryption and decryption. The embodiment used here is the one described above in sections II.D. 1 and 2. The function F is addition, and $F^{-1}$ is subtraction. The function P is multiplication; function $P^{-1}$ is division. All values are expressed in hexadecimal. The plaintext is the string of ASCII characters "HELLO".

Encryption results are as follows:

| Plaintext characters | H | E | L | L | O |
|---|---|---|---|---|---|
| $PT_j$ in binary ASCII | 48 | 45 | 4C | 4C | 4F |
| c(t) | 3 | 27 | 5 | 12 | 19 |
| $y_R$ | 6 | 6 | 6 | 6 | 6 |
| $F (PT_j, c(t))$ | 4B | 6C | 51 | 5E | 68 |
| F, as ASCII character | K | 1 | Q | — | h |
| $P(c(t), y_R)$ | 12 | EA | 1E | 6C | 96 |
| P, as ASCII character | ↕ | Ω | ▲ | 1 | û |

If the ciphertext is formed by alternating F and P values, the ciphertext, when displayed as ASCII characters, reads: K↕1ΩQ▲_1hû.

Decryption results are as follows:

| $P^{-1} (P, y_R)$ | 3 | 27 | 5 | 12 | 19 |
|---|---|---|---|---|---|
| $F^{-1} (F_j, c(t)) = PT_j$ (binary ASCII) | 48 | 45 | 4C | 4C | 4F |
| Plaintext characters | H | E | L | L | O |

V. Conclusion

While various embodiments of the present invention have been described above, it should be understood that they have been presented by way of example, and not limitation. It will be apparent to persons skilled in the relevant art that various changes in detail can be made therein without departing from the spirit and scope of the invention. Thus, the present invention should not be limited by any of the above-described exemplary embodiments, but should be defined only in accordance with the following claims and their equivalents.

What is claimed is:

1. A method by which a sending party engages in encrypted communication with a receiving party, comprising the steps of:

(a) participating in a preliminary exchange of information with the receiving party;

(b) encrypting plaintext to form ciphertext, using a key c(t) that changes for each byte of plaintext, a receiver-unique value $y_R$, and invertible functions F and P, where P is different from F; and (c) sending the ciphertext to the receiving party.

2. The method of claim 1, wherein said step (a) comprises:

(i) encrypting collective identification information of a sending party and a receiving party to form encrypted identification information;

(ii) sending the encrypted identification information to the receiving party; and (iii) receiving a value $y_R$ from the receiving party where $y_R$ is unique to the receiving party.

3. The method of claim 2, wherein said step (i) comprises:

A) generating a key c(t);

B) evaluating F, using the $i^{th}$ byte of identification information and c(t) as inputs, to form $F_i$;

C) evaluating P, using the $i^{th}$ byte of identification information and a sender-unique value $y_S$ as inputs, to form $P_i$; and D) combining $F_i$ and $P_i$ to form ciphertext corresponding to the $i^{th}$ byte of identification information.

4. The method of claim 1, wherein key c(t) is generated randomly for each byte of plain text.

5. The method of claim 1, wherein key c(t) is generated by a deterministic pseudorandom process for each byte of plain text.

6. The method of claim 1, wherein said step (b) comprises:

(i) generating a key c(t);

(ii) evaluating F, using the $j^{th}$ byte of plaintext and c(t) as inputs, to form $F_j$;

(iii) evaluating P, using the $j^{th}$ byte of plaintext and $y_R$ as inputs, to form $P_j$; and (iv) combining the calculated values of $F_j$ and $P_j$ to form ciphertext corresponding to the $j^{th}$ byte of plaintext.

7. The method of claim 1, wherein said step (b) comprises:

(i) generating a key c(t);

(ii) evaluating F, using the $j^{th}$ byte of plaintext and c(t) as inputs, to form $F_j$;

(iii) evaluating P, using c(t) and $y_R$ as inputs, to form $P_j$; and (iv) combining the values of $F_j$ and $P_j$ to form ciphertext corresponding to the $j^{th}$ byte of plaintext.

8. The method of claim 1, further comprising the step of sending a value $y_S$ to the receiving party, where $y_S$ is unique to the sending party.

9. A method by which a receiving party engages in encrypted communication with a sending party, comprising the steps of:

(a) participating in a preliminary exchange of information with the sending party;

(b) receiving, from the sending party, ciphertext corresponding to the $j^{th}$ byte of plaintext $PT_j$;

(c) decrypting the ciphertext using a value $y_R$ unique to the receiving party, a function $P^{-1}$ where $P^{-1}$ is the inverse of a function P, and a function $F^{-1}$, where $F^{-1}$ is the inverse of a function F, and where the function P is different from the function F.

10. The method of claim 9, wherein step (a) comprises:

(i) receiving identification information of the sending party and receiving party encrypted by the sending party using a value $y_S$ unique to the sending party; and (ii) sending $y_R$ to the sending party.

11. The method of claim 10, further comprising the steps of:

(d) receiving $y_S$ from the sending party; and (e) decrypting the encrypted identification information.

12. The method of claim 11, wherein said step (e) comprises:

(i) decomposing the encrypted identification information into a series of pairs of values $F_i$ and $P_i$, where $F_i$ and $P_i$ collectively represent the encrypted $i^{th}$ byte of identification information;

(ii) evaluating $P(F_i, y_S)$;

(iii) evaluating $F^{-1}(P(F_i, y_S), P_i)$, yielding $P(c(t), y_S)$, where $c(t)$ is a key generated by the sending party;

(iv) evaluating $P^{-1}(P(c(t), y_S)y_S)$ to yield $c(t)$; and (v) evaluating $F^{-1}(F_i, c(t))$ to yield the $i^{th}$ byte of identification information.

13. The method of claim 9, wherein said step (c) comprises:

(i) decomposing the ciphertext into a pair of values $F_j = F(PT_j, c(t))$ and $P_j = P(c(t)y_R)$;

(ii) evaluating $P^{-1}(P_j, y_R) = c(t)$; and (iii) evaluating $F^{-1}(F_j, c(t))$ to yield to yield the $j^{th}$ byte of plaintext.

14. The method of claim 9, wherein said step (c) also uses the function P to decrypt the ciphertext and comprises:

(i) decomposing the ciphertext into a pair of values $F_j = F(PT_j, c(t))$ and $P_j = P(PT_j, y_R)$, where $F_j$ and $P_j$ collectively represent the encrypted $j_{th}$ byte of plaintext $PT_j$;

(ii) evaluating $P(F_j, y_R)$;

(iii) evaluating $F^{-1}(P(F_j, y_R), P_j)$, yielding $P(c(t), y_R)$, where $c(t)$ is a key generated by the sending party;

(iv) evaluating $P^{-1}(P(c(t), y_R), y_R)$ to yield $c(t)$; and (v) evaluating $F^{-1}(F_j, c(t))$ to yield the $j^{th}$ byte of plaintext.

15. A system for encrypting plaintext to form ciphertext, comprising:

a key generation module for generating a key $c(t)$, wherein $c(t)$ varies with the time t at which generation takes place;

logic for evaluating an invertible function F, wherein F accepts as inputs $c(t)$ and a byte of plaintext and forms an F value;

logic for evaluating an invertible function P, wherein P accepts as an input a value $y_R$ unique to a receiving party and forms a P value; and logic for combining the F and P values, wherein P is different from F.

16. The system of claim 15, wherein P further accepts as input and a byte of plaintext, and forms said P value dependent on said byte of plaintext and on said value $y_R$.

17. The system of claim 15, wherein P further accepts as input said $c(t)$, and forms a P value dependent on said $c(t)$ and on said value $y_R$.

18. The system of claim 15, wherein said key generation module comprises a random data source, and wherein $c(t)$ represents a sample taken from said random data source at time t.

19. The system of claim 15, wherein said key generation module comprises a deterministic pseudorandom data generator, and wherein $c(t)$ represents the output of said deterministic pseudo random data generator at time t.

20. A system for decrypting ciphertext to form a byte of plaintext, comprising:

logic for decomposing the ciphertext into $F_j$ and $P_j$ values;

logic for evaluating an inverse function $P^{-1}$ of a function P; and logic for evaluating an inverse function $F^{-1}$ of a function F;

wherein said function $P^{-1}$ accepts the $P_j$ value and a value $y_R$ specific to a receiving party as inputs to produce a key $c(t)$;

wherein said function $F^{-1}$ accepts said $F_j$ value and said $c(t)$ as inputs to form the byte of plaintext; and wherein P is different from F.

21. A system for decrypting ciphertext to form a byte of plaintext, comprising:

logic for decomposing the ciphertext into $F_j$ and $P_j$ values;

logic for evaluating an inverse function $P^{-1}$ of a function P;

logic for evaluating an inverse function $F^{-1}$ of a function F; and logic for evaluating said function P, wherein P accepts the $F_j$ value and a value $y_R$ specific to a receiving party as inputs, to produce a first input to $F^{-1}$, wherein said function $F^{-1}$ accepts the $P_j$ value as a second input to produce an input to said function $P^{-1}$, wherein said $P^{-1}$ also accepts $y_R$ as input and produces said $c(t)$, and wherein $c(t)$ and the $F_j$ value are input to said function $F^{-1}$ to further form the byte of plaintext.

* * * * *

UNITED STATES PATENT AND TRADEMARK OFFICE
CERTIFICATE OF CORRECTION

PATENT NO.   : 6,640,303 B1
DATED        : October 28, 2003
INVENTOR(S)  : Ky Quy Vu It is certified that error appears in the above-identified patent and that said Letters Patent is hereby corrected as shown below:

<u>Column 8,</u>
Line 61, please replace "plaintext 1625" with -- ciphertext 1625 --.

Signed and Sealed this

Third Day of February, 2004

JON W. DUDAS
*Acting Director of the United States Patent and Trademark Office*